United States Patent
Schlabach et al.

(10) Patent No.: US 6,510,750 B2
(45) Date of Patent: Jan. 28, 2003

(54) STEERING WHEEL TORQUE AND POSITION SENSOR

(75) Inventors: Roderic A. Schlabach, Goshen, IN (US); Jeffery Hershberger, Elkhart, IN (US); John T. Lewis, Granger, IN (US); Steven R. Mitchell, Niles, MI (US); James E. White, Warsaw, IN (US)

(73) Assignee: CTS Corporation, Elkhart, IN (US)

( * ) Notice: Subject to any disclaimer, the term of this patent is extended or adjusted under 35 U.S.C. 154(b) by 17 days.

(21) Appl. No.: 09/837,075

(22) Filed: Apr. 18, 2001

(65) Prior Publication Data

US 2001/0048301 A1 Dec. 6, 2001

Related U.S. Application Data

(63) Continuation-in-part of application No. 09/564,313, filed on May 3, 2000.
(51) Int. Cl.$^7$ .............................. G01L 3/02; G01L 1/16
(52) U.S. Cl. ............................. 73/862.325; 73/862.68
(58) Field of Search ................... 73/862.625, 862.193, 73/862.325, 862.68, 862.326

(56) References Cited

U.S. PATENT DOCUMENTS

| | | | | | |
|---|---|---|---|---|---|
| 5,311,666 A | * | 5/1994 | Jacobsen et al. | ............ | 33/1 N |
| 5,763,793 A | * | 6/1998 | Ng et al. | ............... | 73/862.325 |
| 5,837,908 A | * | 11/1998 | Ng et al. | ............... | 73/862.325 |
| 6,190,264 B1 | * | 2/2001 | Al-Rawi | ............... | 464/185 |
| 6,291,914 B1 | * | 9/2001 | Mukaiyama | ............ | 310/68 B |
| 6,295,879 B1 | * | 10/2001 | Miller et al. | ............... | 180/444 |

* cited by examiner

Primary Examiner—Max Noori
Assistant Examiner—Lilybett Martir
(74) Attorney, Agent, or Firm—Mark Bourgeois

(57) ABSTRACT

A sensor for measuring torque and position of a shaft having an internal torsion bar. The sensor has a torque sensor, located in the housing and connected to the shaft. The torque sensor has a rotor in electrical contact with a first and second resistive track disposed on an opposed disc. A position sensor is located in the housing and is connected to the shaft. The position sensor has a third contactor mounted to the housing in electrical contact with a third resistive track located on the disc. Several electrical terminals are located in the housing and are electrically communicated with the contactors to provide an electrical signal indicative of the torque and position of the shaft to an external electrical circuit. A slip ring is attached between the rotor and the housing. The slip ring has a fourth and fifth contactor in contact with the torque sensor. The slip ring is adapted to electrically connect the torque sensor to the electrical terminals.

27 Claims, 5 Drawing Sheets

STEERING WHEEL TORQUE AND POSITION SENSOR

CROSS REFERENCE TO RELATED AND CO-PENDING APPLICATIONS

This application is a continuation in part of U.S. patent application Ser. No. 09/564,313, filed May 03, 2000 and titled, "Non-Contacting Sensor for Measuring Relative Displacement between Two Rotating Shafts".

The foregoing patent has the same assignee as the instant application and is herein incorporated by reference in entirety for related and supportive teachings.

BACKGROUND OF THE INVENTION

1. Field of the Invention

This invention relates to sensors. In particular, there is a sensor that can measure the relative displacement between two rotating shafts. The sensor can be used to sense the amount of torque applied to a steering wheel in a vehicle as well as the position of the steering wheel.

2. Descripton of the Related Art

Various devices and methods of dealing with the design of steering wheel sensors are known.

Examples of prior art steering wheel sensors are shown in U.S. Pat. Nos. 5,763,793 and 5,837,908. The devices described in these patents measure torque applied to a steering wheel. Unfortunately, these devices are very expensive and difficult to manufacture because of the large number of rotating contacts needed to collect the electrical signal and then to bring the electrical signal off the rotating member to a connector. For example, the device of the '908 patent requires 16 electrical contacts. Since, the contacts are made of a precious metal typically high in palladium, they are very expensive and quickly add cost to the device.

The automotive industry has been focusing on electrical assist power steering for vehicles. The electrical assist power steering unit is an electrical motor attached to the steering linkage that operates when assist is required. A large amount of torque on the steering wheel occurs at low speed operation or during parking. The electrical assist power steering is generally not needed during high speed operation such as during highway driving. The major advantages of electrical assist power steering are first, that it only operates during the short time of turning and is inoperative the rest of the time and second that it is simpler to manufacture. In a hydraulic power steering system, the power steering pump is always being turned by the engine and represents an energy drain on the motor all the time even though steering is only performed during a small percentage of the total time a car is operated. An electrical assist power steering system requires sensing of torque applied to the steering wheel. The torque indicates how much force the operator is exerting to move the wheel. The output signal from a torque sensor is fed into a control unit which controls the electrical motor of the assist unit. When the torque sensed is high, the assist applied to the steering linkage will be high. When the torque sensed is low, the assist applied to the steering linkage will be low. Unfortunately, the current electrical assist power steering units tend to overshoot or overcompensate once it is activated. The operator will tend to have to counter compensate a small amount with the wheel during operation so that the wheel does not turn beyond the desired turning point. It is desirable to provide an advanced electrical assist power steering system with better operator ergonomics that feels the same during operation as the current hydraulic power steering systems. In order to accomplish this, the control unit needs precise torque information. With a precise torque sensor, the control unit can operate in various modes. For example, when the steering wheel rotation is reversed, the rotational position sensor can sense the reversal and the electric motor can be reversed before a large reverse torque is built up on the wheel and felt by the operator. This faster motor reversal leads to better operator ergonomics.

In general, a sensor that measures the relative displacement between two rotating shafts has useful applications in the areas of industrial machinery, aerospace, electrical power generation and transportation.

There is a current unmet need for precise steering wheel torque sensor that is readily manufacturable at low cost. Additionally, there is a current unmet need for a sensor to measure the relative displacement between two rotating shafts.

SUMMARY OF THE INVENTION

It is a feature of the invention to provide a steering wheel sensor that can sense torque applied to the steering wheel of a vehicle and the rotary position of the steering wheel.

Yet, another feature of the invention is to provide a torque sensor for measuring the torque applied to a first and second shaft connected by a torsion bar. The sensor includes a housing having a apertures at each end thereof. The shafts pass through the housing. A rotor is located in the housing and connected to the first shaft. The rotor has a top surface, a bottom surface and a side surface. The rotor further has a first and second contactor located on the bottom surface and a first and second conductive track located on the side surface. The conductive tracks are electrical contact with the first and second contactors. A rotating disc is connected to the second shaft. The disc has a top surface and a bottom surface. A first and second resistive track are disposed on the top surface of the disc. The first and second contactor contact the resistive tracks. A third and fourth contactor are located in the housing and are in electrical contact with the conductive tracks. A first and second electrical terminal are located in the housing and are electrically communicated with the third and fourth contactors to provide an electrical signal indicative of the torque on the shafts to an external electrical circuit.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

DETAILED DESCRIPTION OF THE PREFERRED EMBODIMENT

Figure 1:
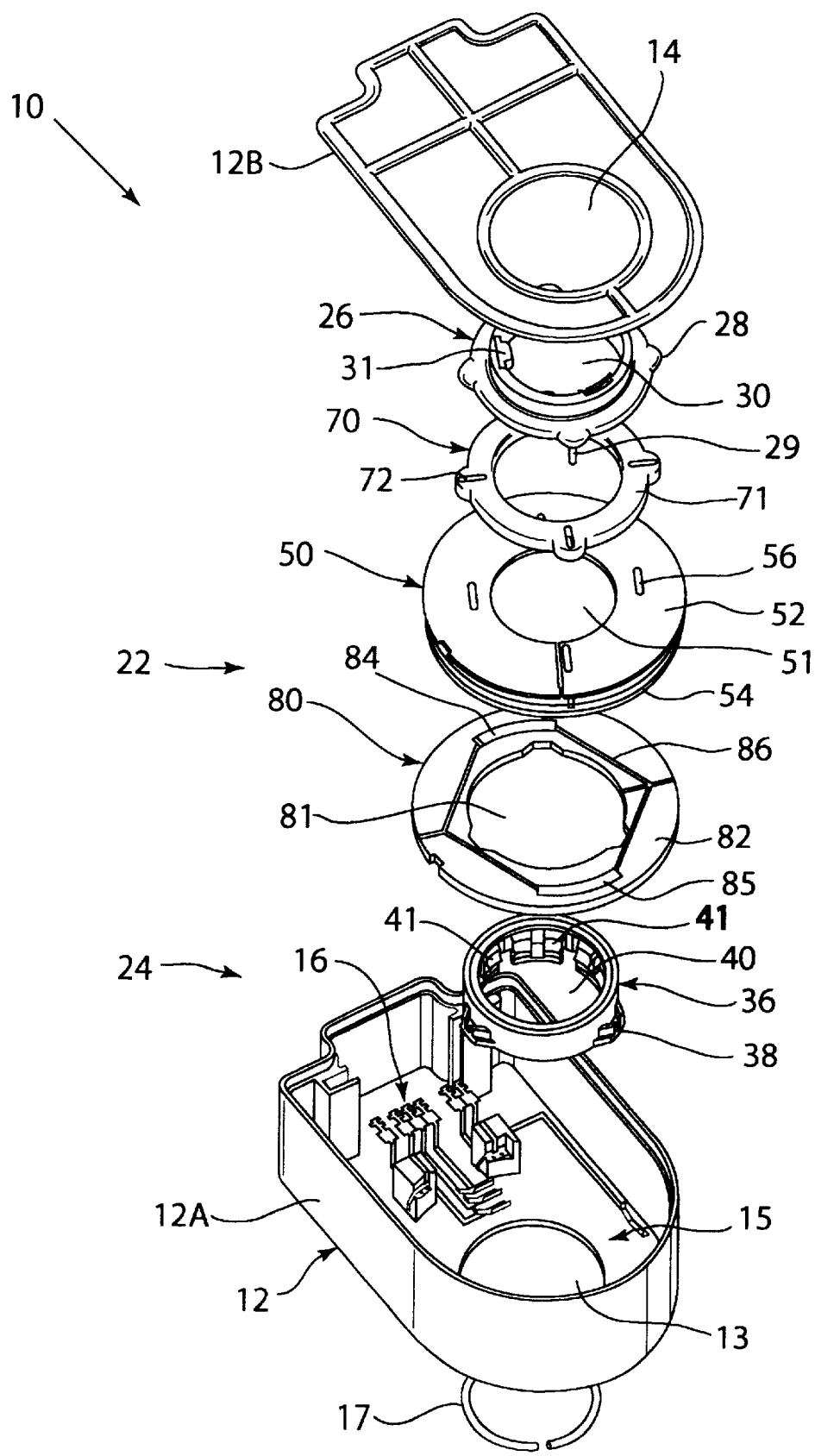
FIG. 1 is an exploded perspective view of the preferred embodiment of a steering wheel torque and position sensor.
Figure 2:
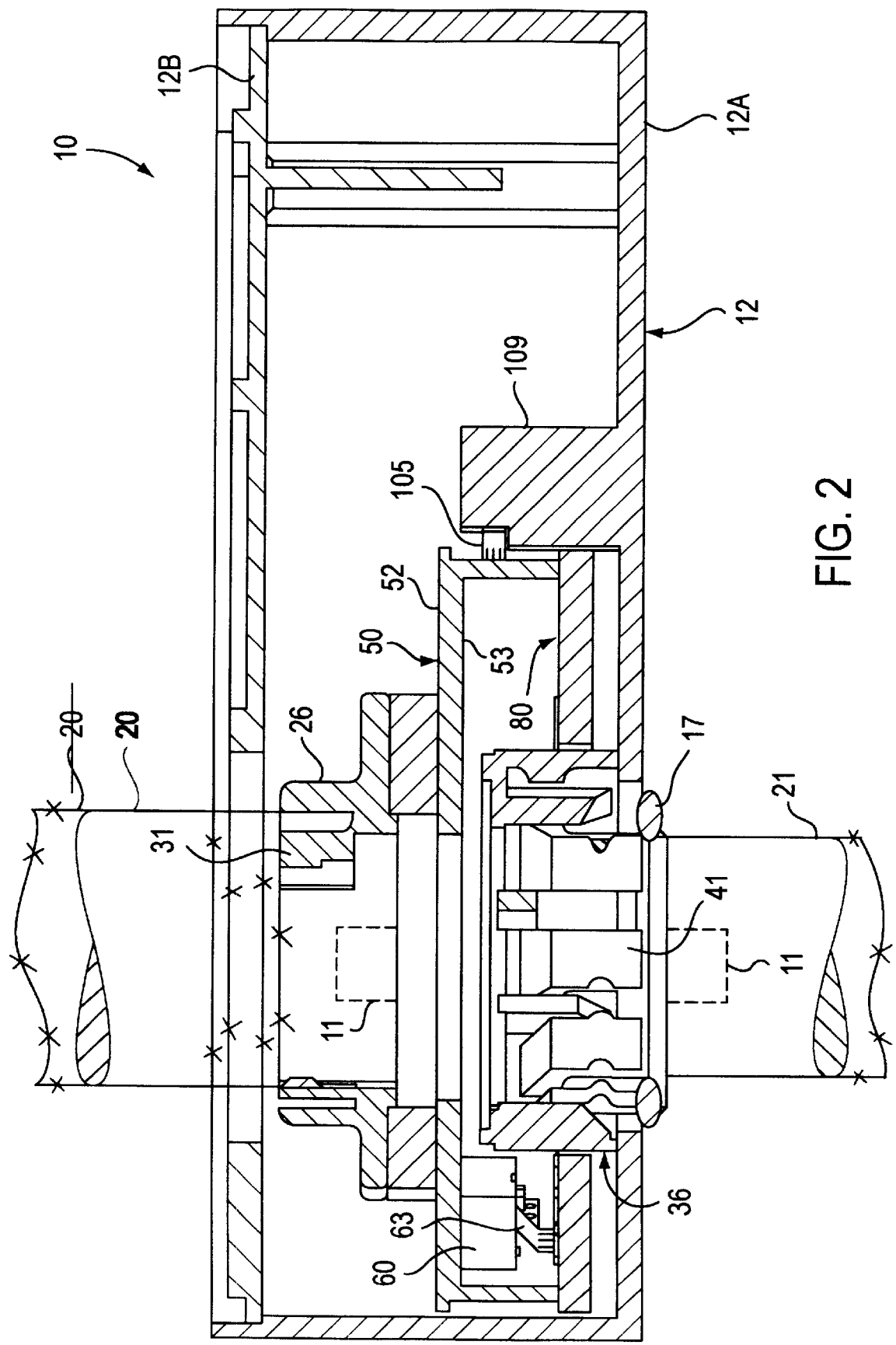
FIG. 2 is a cross sectional view of the sensor of FIG. 1 in an assembled state.

Referring to FIGS. 1 and 2 there is a sensor assembly 10 shown. In particular, sensor assembly 10 has a housing 12. Housing 12 has a bottom 12A and a top 12B. Housing bottom 12A has connector terminals 16 that provide an electrical connection from the inside of the housing to an external electrical circuit (not shown) using a wiring harness (not shown). Housing bottom 12A has an aperture 13 and housing top 12B has an aperture 14. Housing bottom 12A forms a cavity 15. A pair of shafts 20 and 21 extend through apertures 13 and 14, respectively. Shafts 20 and 21 have splines and/or keyways (not shown) to mate with respective parts of the sensor assembly 10. In the center of the shaft, typically a conventional torsion bar 11 is used to connect the shafts together. Internal splines (not shown) or other fixing methods on shafts 20 and 21 would be used to connect with the torsion bar. The torsion bar transmits the load between the two shafts and allows flexing or twisting to allow relative angular displacement of the shafts in proportion to the amount of torque placed on the shafts. In an automotive application, shaft 20 can be a steering wheel shaft that connects to a steering wheel and shaft 21 can be a steering linkage shaft that connects to a steering linkage gear box. The amount of difference in the relative rotational displacement of shaft 20 and 21 is proportional to the magnitude of torque being applied to the steering wheel. A snap ring 17 retains lower carrier 36 against shaft 21.

Sensor assembly 10 has a torque sensor 22 and a position sensor 24 contained within housing 12. The torque sensor 22 generates an electrical signal proportional to the amount of angular displacement between shafts 20 and 21. The position sensor 24 generates an electrical signal that corresponds to the rotational position of the shafts.

An upper carrier 26 is connected to shaft 20 and a lower carrier 36 is connected to shaft 21. The upper carrier 26 has a bore 30 that passes through carrier 26. Four arms 28 extend radially away from carrier 26. A pair of posts 29 extends downwardly from two of the arms 28. Several projections 31 extend into bore 30 and mate with the splines on shaft 20.

A lower carrier 36 is connected to shaft 21. The lower carrier 36 has a bore 40. Three arms 38 extend radially away from carrier 36. Several projections 41 extend into bore 40 and mate with the splines on shaft 21.

A concentricity compensator 70 has a concentricity disc 71 with four slots 72. Disc 71 is engaged with upper carrier 26. Two of the slots 72 fit over and are engaged with posts 29 of upper carrier 26. The concentricity compensator 70 allows sensor 10 to rotate and perform properly when the axes of rotation of shafts 20 and 21 are slightly non co-axial.

Figure 3:
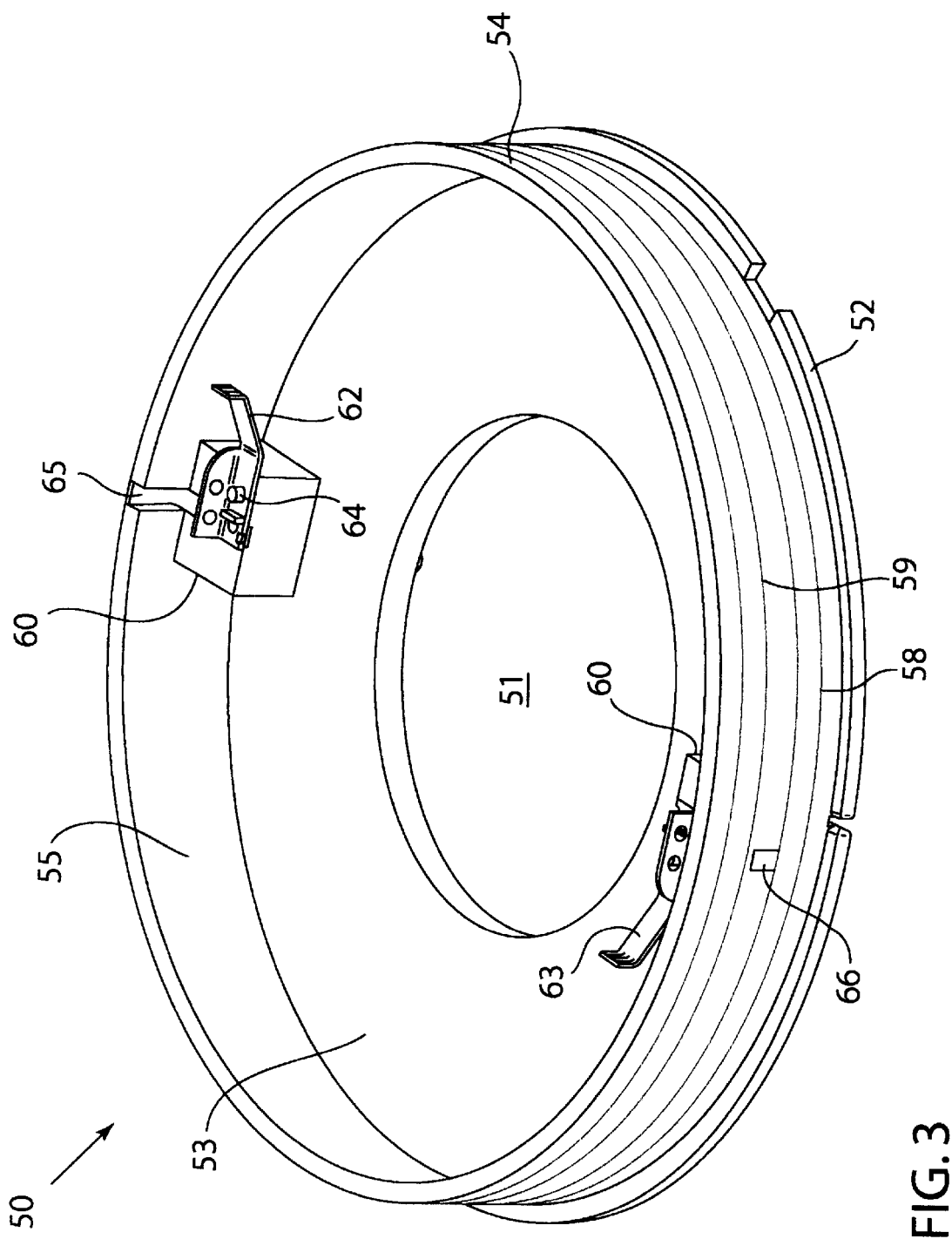
FIG. 3 is an enlarged perspective view of the rotor.

Referring further to FIG. 3, a slip ring or rotor 50 is shown. Slip ring 50 has a bore 51 extending therethrough. Slip ring 50 has a top surface 52, a bottom surface 53, an outer side surface 54 and an inner side surface 55. A pair of pins 56 extend upwardly from surface 52. Pins 52 fit into two of slots 72. Slip ring 50 would be injection molded out of plastic. A pair of conductive tracks or circuit lines 58 and 59 are located on outer side surface 54. Tracks 58 and 59 are electrically conductive. A pair of support blocks 60 are located on surface 53 adjacent inner side surface 55. A pair of wiper arms or contactors 62 and 63 are mounted to support block 60. Contactor 62 is fastened to block 60 by heat staking over pin 64. A pair of metal strips 65 and 66 are insert molded into ring 50. Metal strip 65 electrically connects contactor 62 to track 59. Metal strip 66 electrically connects contactor 63 to track 58.

Figure 6:
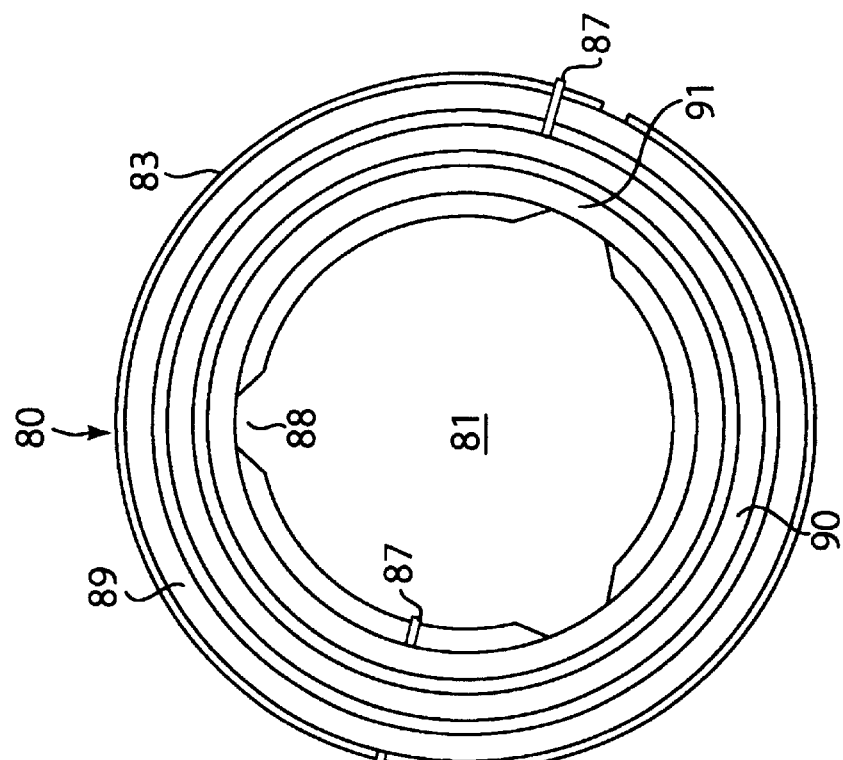
FIG. 6 is top view of the element.
Figure 5:
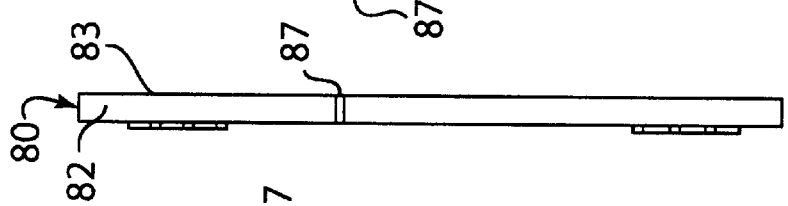
FIG. 5 is a side view of the element.
Figure 4:
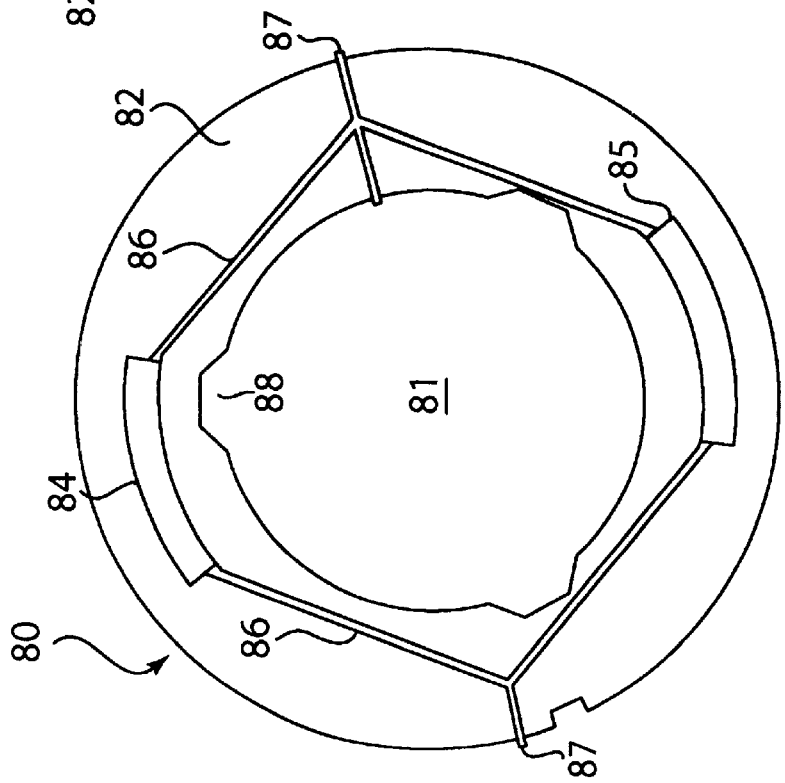
FIG. 4 is a bottom view of the element.

Referring further to FIGS. 4, 5 and 6, a ceramic substrate 80 is shown. Substrate 80 has a bore 81 extending therethrough. Three notches 88 extend into substrate 80 from bore 81. Substrate 80 has a top surface 82 and a bottom surface 83. Substrate 80 is preferably formed from conventional alumina ceramic. A pair of cermet resistors 84 and 85 are formed on surface 82. Resistors 84 and 85 are formed by screening and firing a conventional thick film cermet resistor material. Resistors 84 and 85 measure the torque on the shafts. Conductive lines 86 connect resistors 84 and 85 to edge around 87. Conductive lines 86 and edge around 87 are formed from conventional thick film conductor material. A circular resistive track 89 is formed on surface 83. A pair of circular conductive tracks 90 and 91 are formed on surface 83. Resistive track 89 measures the rotary position of the steering wheel.

Figure 7:
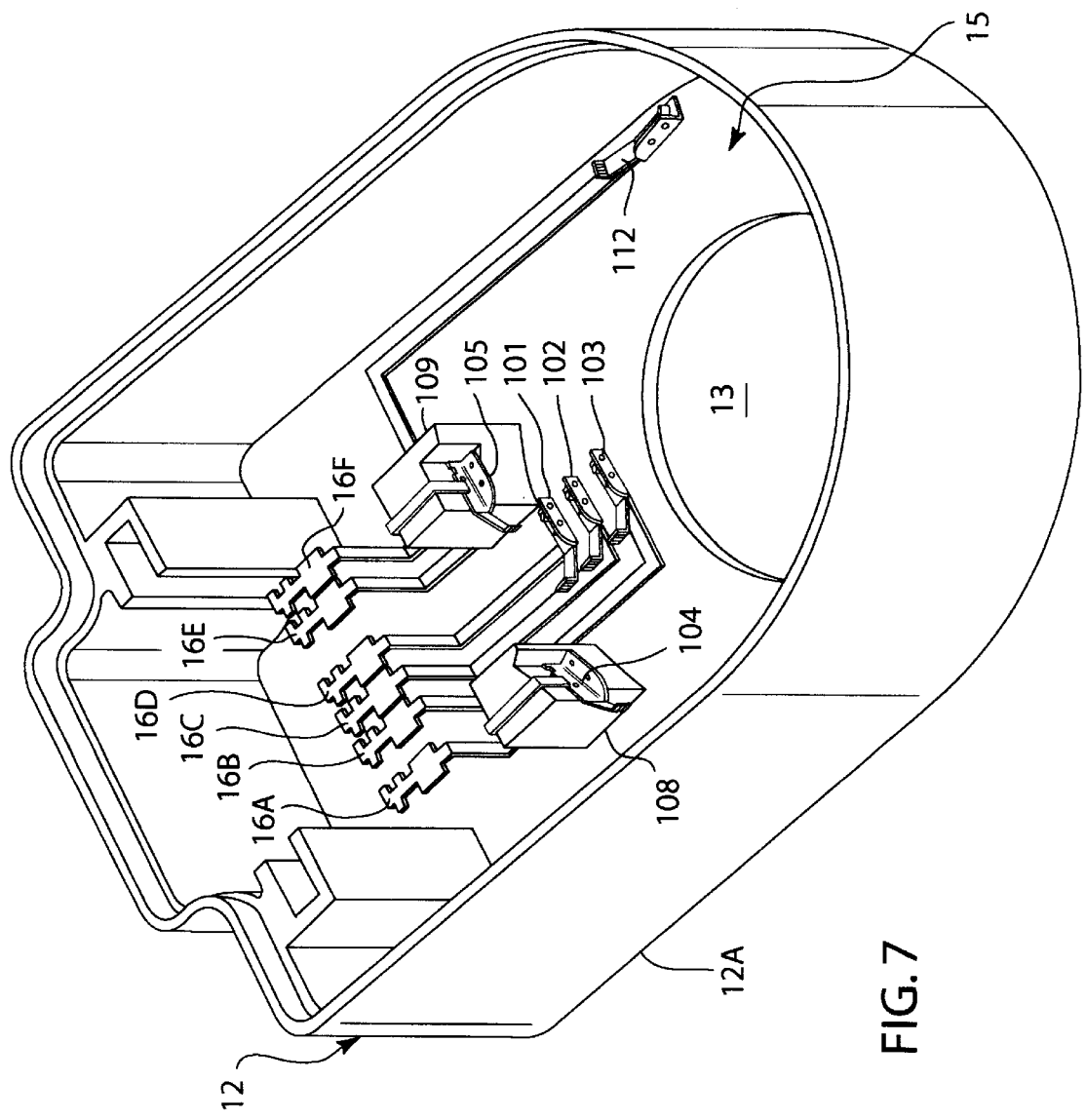
FIG. 7 is an enlarged perspective view looking into the housing.

Referring now to FIGS. 1 and 7, terminals 16 are connected to contactors or wipers 101, 102, 103 and 112. Contactors 101, 102, 103 and 112 are mounted on the bottom of housing 12. Terminals 16 are also connected to contactors 104 and 105. Contactors 104 and 105 are mounted on blocks 108 and 109, respectively.

Referring to FIG. 2 and the other figures, when sensor 10 is assembled, contactors 62 and 63 are in contact with resistors 84 and 85. Contactor 101 is in contact with resistive track 89. Contactor 102 is in contact with conductive track 90. Contactor 103 is in contact with conductive track 91. Contactor 104 is in contact with conductive track 58. Contactor 105 is in contact with conductive track 59. Contactor 112 is in contact with resistive track 89. Contactor 112 is positioned 90 degrees from contactor 101 so that an electrical signal from contactor is 90 degrees out of phase with an electrical signal from contactor 101.

Sensor 10 operates as follows: Shaft 20 is engaged with upper carrier 26 which is connected to rotor 50. Shaft 21 is engaged with lower carrier 36 which is engaged with substrate 80. A source of power or voltage of about 5 volts is applied to terminal 16B which is connected to contactor 103 which is in electrical contact with conductive track 91. A ground is connected to terminal 16C which is connected to contactor 102 which is in electrical contact with conductive track 90. Track 91 is in electrical connection with resistors 84, 85 and resistive track 89 through edge around 87 and supplies electrical power to these components.

When shafts 20 and 21 rotate the same or rotate co-axial with each other, element 80 rotates tracks 89, 90 and 91 about contactors 101, 102, 103 and 112. Outermost track 89 is in electrical communication with terminal 16D through contactors 101. Similarly, outermost track 89 is in electrical communication with terminal 16F through contactor 112. As element 80 rotates, electrical signals indicating the rotational position of the steering wheel are generated at terminals 16D and 16F. The voltages at terminals 16D and 16F will vary from 0 to 5 volts and then back to 0 again. The signals at terminals 16D and 16F are delayed or offset by 90 degrees.

Contactors 62 and 63 are in contact with resistors 84 and 85. When no torque is applied to shafts 20 and 21 as they rotate, the relative positions of contactors 62 and 63 with respect to resistors 84 and 85, respectfully are unchanged and the resulting electrical signal on contactors 62 and 63 are unchanged.

However, when shafts 20 and 21 do not rotate with the same rotational displacement, the relative positions of contactors 62 and 63 on element 80 changes. The resulting electrical signals on contactors 62 and 63 also changes. The more torque that is applied then the larger the change in electrical signal. Therefore, resistors 84 and 85 generate an electrical signal that is proportional to the relative rotational displacement of shafts 20 and 21. The resulting electrical signals from resistors 84 and 85 are of equal and opposite slopes.

Contactors 62 and 63 are connected to conductive tracks 59 and 58 through metal strips 65 and 66. Wipers 104 and 105 are in contact with tracks 58 and 59. Wipers 104 and 105 and tracks 58 and 59 provide the connecting mechanism to get the electrical signals that are proportional to torque off of substrate 80 and onto terminals 16A and 16E. Wipers 104 and 105 are electrically connected to terminals 16A and 16E.

An external electrical circuit (not shown) would be connected to terminals 16A–16F. The external circuitry can condition the electrical signals and control other mechanisms. For example, in an automotive steering wheel application, the two shafts can be connected to a steering wheel and to a steering linkage. In this case, the electrical signal is proportional to the amount of torque placed on the steering wheel and can be useful to control an electric power assist steering system. A position electrical signal provides a signal regarding the steering wheel position.

One of ordinary skill in the art of designing and using sensors will realize many advantages from studying and using the preferred embodiment. For example, the sensor uses few precious metal contactors. Another advantage is that the disc containing the resistors rotates. The invention provides a robust cost effective solution to the problem of sensing steering wheel torque and position.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. A torque sensor for measuring the torque applied to a first and a second shaft the first and second shafts connected by a torsion bar, the sensor, comprising:
   a) a housing having apertures at each end thereof, the shafts passing through the housing;
   b) a rotor, located in the housing and connected to the first shaft, the rotor having a top surface, a bottom surface and a side surface, the rotor further having a first and second contactor located on the bottom surface and a first and second conductive track located on the side surface, the conductive tracks in electrical contact with the first and second contactors;
   c) a rotating disc connected to the second shaft, the disc having a top surface and a bottom surface;
   d) a first and second resistive track disposed on the top surface of the disc, the first and second contactor contacting the resistive tracks;
   e) a third and fourth contactor located in the housing and in electrical contact with the conductive tracks; and
   f) a first and second electrical terminal located in the housing and electrically communicated with the third and fourth contactors for providing an electrical signal indicative of the torque on the shafts to an external electrical circuit.

2. The sensor according to claim 1, wherein the sensor further comprises:
   a) a third resistive track disposed on the bottom surface of the disc;
   b) a fifth contactor in contact with the third resistive track; and
   c) a third electrical terminal located in the housing and electrically communicated with the fifth contactor for providing an electrical signal indicative of the rotary position of the shafts to an external electrical circuit.

3. The sensor according to claim 1, wherein the sensor further comprises:
   (a) a third and fourth conductive track disposed on the bottom surface of the disc;
   (b) a sixth and seventh contactor in contact with the third and fourth conductive tracks; and
   (c) a third and fourth electrical terminal located in the housing and electrically communicated with the sixth and seventh contactor, the third and fourth terminals connectable to a source of power and ground for providing the source of power to the sensor.

4. The sensor according to claim 1, wherein a conductor line electrically connects the first and second resistive tracks.

5. The sensor according to claim 4, wherein a first edge around electrically connects the conductor line to the third resistive track.

6. The sensor according to claim 4, wherein a second edge around electrically connects the conductor line to the third conductive track.

7. The sensor according to claim 4, wherein a third edge around electrically connects the conductor line to the fourth conductive track.

8. The sensor according to claim 1, wherein an upper carrier is attached to first shaft, the rotor attached to the upper carrier.

9. The sensor according to claim 8, wherein a concentricity compensator is mounted between the upper carrier and the rotor.

10. The sensor according to claim 1, wherein a lower carrier is attached to the second shaft, the disc attached to the lower carrier.

11. A sensor for measuring torque and position comprising:
   a) a first shaft and a second shaft connected by a torsion bar, an upper carrier attached to the first shaft;
   b) a housing having apertures at each end thereof, the shafts passing into the housing;
   c) a torque sensor, located in the housing and connected to the shafts, the torque sensor having a rotor attached to the upper carrier and having a first and a second contactor in electrical contact with a first and second resistive track disposed on an opposed disc;
   d) a position sensor, located in the housing and connected to the shafts, the position sensor having a third contactor mounted to the housing in electrical contact with a third resistive track disposed on the disc; and
   e) a plurality of electrical terminals located in the housing and electrically communicated with the contactors for providing an electrical signal indicative of the torque and position of the shafts to an external electrical circuit.

12. The sensor according to claim 11 wherein the rotor has a first and second conductive track.

13. The sensor according to claim 12 wherein a fourth and fifth contactor are in contact with the first and second conductive tracks, respectively for electrically connecting the torque sensor to the electrical terminals.

14. The sensor according to claim 13, wherein the fourth and fifth contactors are mounted to the housing.

15. The sensor according to claim 11, wherein a concentricity compensator is mounted between the upper carrier and the rotor.

16. The sensor according to claim 11, wherein a lower carrier is attached to the second shaft, the disc attached to the lower carrier.

17. The sensor according to claim 11, wherein a conductor line is located on the disc and electrically connects the first and second resistive tracks.

18. The sensor according to claim 17, wherein a first edge around is located on the disc and electrically connects the conductor line to the third resistive track.

19. The sensor according to claim 18, wherein a second edge around located on the disc electrically connects the conductor line to a third conductive track on the disc.

20. The sensor according to claim 19, wherein a third edge around located on the disc electrically connects the conductor line to a fourth conductive track on the disc.

21. The sensor according to claim 19, wherein a fourth contactor is mounted to the housing and is in electrical contact with the third resistive track.

22. The sensor according to claim 21, wherein the third and fourth contactor are separated by ninety degrees.

23. A torque and position sensor for measuring the torque applied to a first and a second shaft the first and second shafts located co-axially and connected by a torsion bar, the sensor, comprising:

a) a housing having apertures at each end thereof, the shafts each having an end that extends into the housing;

b) a rotor, located in the housing and connected to the end of the first shaft, the rotor having a top surface and a bottom surface;

c) a first and second contactor located on the bottom surface of the rotor;

d) a first and second conductive track located on the rotor, the conductive tracks electrically communicated with the first and second contactors;

e) a rotating disc connected to the second shaft, the disc having a top surface and a bottom surface;

f) a first and second resistive track disposed on the top surface of the disc, the first and second contactor contacting the resistive tracks so as to form the torque sensor;

g) a third resistive track located on the bottom surface of the disc;

h) a third contactor mounted to the housing and in electrical contact with the third resistive track so as to form the position sensor; and i) a plurality of terminals mounted to the housing and electrically communicated with the contactors for providing an electrical signal indicative of torque and position to an external electrical circuit.

24. The sensor according to claim 23 wherein a fourth contactor is mounted to the housing and the disc has a third conductive track, the fourth contactor in electrical contact with the third conductive track, the fourth contactor adapted to be connected to a power source.

25. The sensor according to claim 24 wherein the third conductive track is connected to the resistive tracks.

26. The sensor according to claim 23 wherein the third resistive track rotates while the third contactor is stationary.

27. The sensor according to claim 23 wherein the disc and rotor rotate together when no torque is applied between the first and second shafts, the disc and rotor having a relative rotational displacement when a torque is applied between the first and second shafts.

* * * * *